US008316710B2

(12) United States Patent
Terazawa et al.

(10) Patent No.: US 8,316,710 B2
(45) Date of Patent: Nov. 27, 2012

(54) PHYSICAL QUANTITY MEASURING APPARATUS

(75) Inventors: Tomohito Terazawa, Okazaki (JP); Takamoto Watanabe, Nagoya (JP)

(73) Assignee: Denso Corporation, Kariya (JP)

( * ) Notice: Subject to any disclaimer, the term of this patent is extended or adjusted under 35 U.S.C. 154(b) by 421 days.

(21) Appl. No.: 12/587,555

(22) Filed: Oct. 8, 2009

(65) Prior Publication Data

US 2010/0087966 A1    Apr. 8, 2010

(30) Foreign Application Priority Data

Oct. 8, 2008    (JP) .................................. 2008-261809

(51) Int. Cl.
*G01P 15/14*    (2006.01)
*G01C 19/24*    (2006.01)
(52) U.S. Cl. .................................. 73/514.18; 73/504.03
(58) Field of Classification Search ............... 73/514.18, 73/514.17, 514.32, 504.02, 504.03, 504.04, 73/504.12
See application file for complete search history.

(56) References Cited

U.S. PATENT DOCUMENTS

| | | | | |
|---|---|---|---|---|
| 5,465,604 A | * | 11/1995 | Sherman | 73/1.38 |
| 5,574,211 A | * | 11/1996 | Shimada et al. | 73/1.38 |
| 5,698,783 A | * | 12/1997 | Murakoshi et al. | 73/504.03 |
| 5,719,335 A | * | 2/1998 | Nakaishi et al. | 73/514.18 |
| 6,082,196 A | * | 7/2000 | Nonoyama et al. | 73/514.18 |
| 7,068,744 B2 | * | 6/2006 | Watanabe | 375/346 |
| 7,426,859 B2 | * | 9/2008 | Greene et al. | 73/504.02 |
| 2005/0047526 A1 | | 3/2005 | Watanabe | |

FOREIGN PATENT DOCUMENTS

| | | |
|---|---|---|
| JP | 8-178955 | 7/1996 |
| JP | 2005-102129 | 4/2005 |
| JP | 2005-140709 | 6/2005 |
| JP | 2005-308667 | 11/2005 |
| JP | 2006-170802 | 6/2006 |
| JP | 2007-232575 | * 9/2007 |

OTHER PUBLICATIONS

Office action dated Sep. 14, 2010 in corresponding Japanese Application No. 2008-261809.

* cited by examiner

*Primary Examiner* — Helen C. Kwok
(74) *Attorney, Agent, or Firm* — Harness, Dickey & Pierce, PLC

(57) ABSTRACT

The physical quantity measuring apparatus includes a first function of generating voltage used for position-controlling a movable body, a second function of detecting a position of the movable body during a position detecting period, a third function of calculating a control amount necessary to keep the movable body at a predetermined position on the basis of a detection result by the second function, and causing the first function to generate a control voltage corresponding to the calculated control amount to keep the movable body at the predetermined position during a position controlling period, and a fourth function of setting the position detecting period and the position controlling period in a time-sharing manner so that the position detecting period and the position controlling period do not overlap with each other.

9 Claims, 9 Drawing Sheets

FIG.5A

DEMODULATING CIRCUIT

PROCESS #6 ⇒ $+DT_1-DT_2-DT_3+DT_4+DT_5-DT_6-DT_7+DT_8+DT_9-DT_{10}-DT_{11}+DT_{12}+DT_{13}-DT_{14}-DT_{15}+DT_{16}$
PROCESS #5 ⇒ $+DT_1+DT_2-DT_3-DT_4+DT_5+DT_6-DT_7-DT_8+DT_9+DT_{10}-DT_{11}-DT_{12}+DT_{13}+DT_{14}-DT_{15}-DT_{16}$
PROCESS #4 ⇒ $+DT_1+DT_2-DT_3-DT_4-DT_5-DT_6+DT_7+DT_8+DT_9+DT_{10}-DT_{11}-DT_{12}-DT_{13}-DT_{14}+DT_{15}+DT_{16}$
PROCESS #3 ⇒ $+DT_1+DT_2+DT_3+DT_4-DT_5-DT_6-DT_7-DT_8+DT_9+DT_{10}+DT_{11}+DT_{12}-DT_{13}-DT_{14}-DT_{15}+DT_{16}$
PROCESS #2 ⇒ $+DT_1+DT_2+DT_3+DT_4+DT_5+DT_6+DT_7+DT_8-DT_9-DT_{10}-DT_{11}-DT_{12}-DT_{13}-DT_{14}-DT_{15}-DT_{16}$
PROCESS #1 ⇒ $+DT_1+DT_2+DT_3+DT_4+DT_5+DT_6+DT_7+DT_8+DT_9+DT_{10}+DT_{11}+DT_{12}+DT_{13}+DT_{14}+DT_{15}+DT_{16}$

FIG.5B

|  | S1 | S2 | S3 | S4 | S5 | S6 |
|---|---|---|---|---|---|---|
| PROCESS #6 ⇒ | × | × | × | × | × | ○ |
| PROCESS #5 ⇒ | × | × | × | × | ○ | × |
| PROCESS #4 ⇒ | × | × | × | ○ | × | × |
| PROCESS #3 ⇒ | × | × | ○ | × | × | × |
| PROCESS #2 ⇒ | × | ○ | × | × | × | × |
| PROCESS #1 ⇒ | ○ | × | × | × | × | × |

○ → INTEGRATION
× → DEINTEGRATION

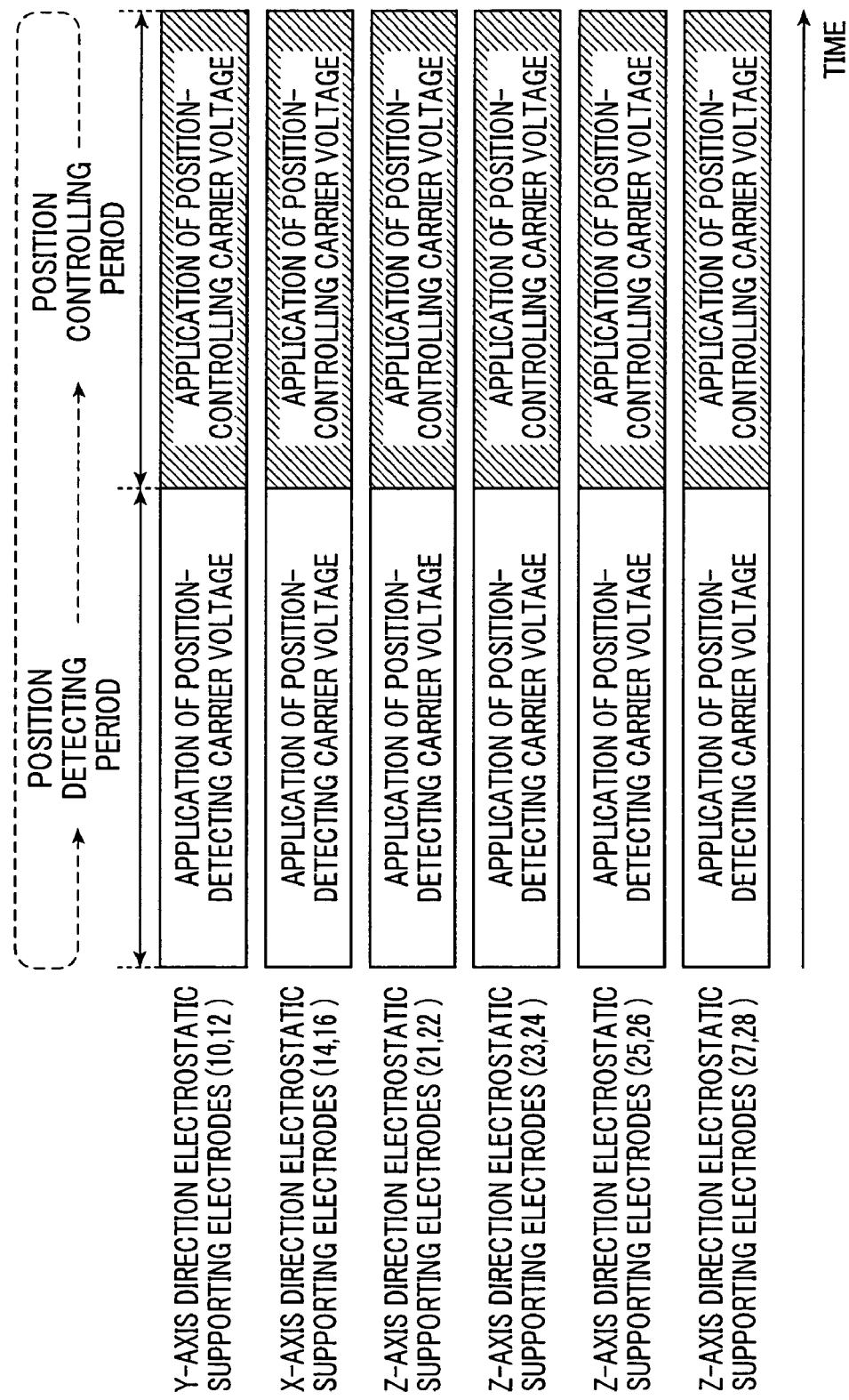

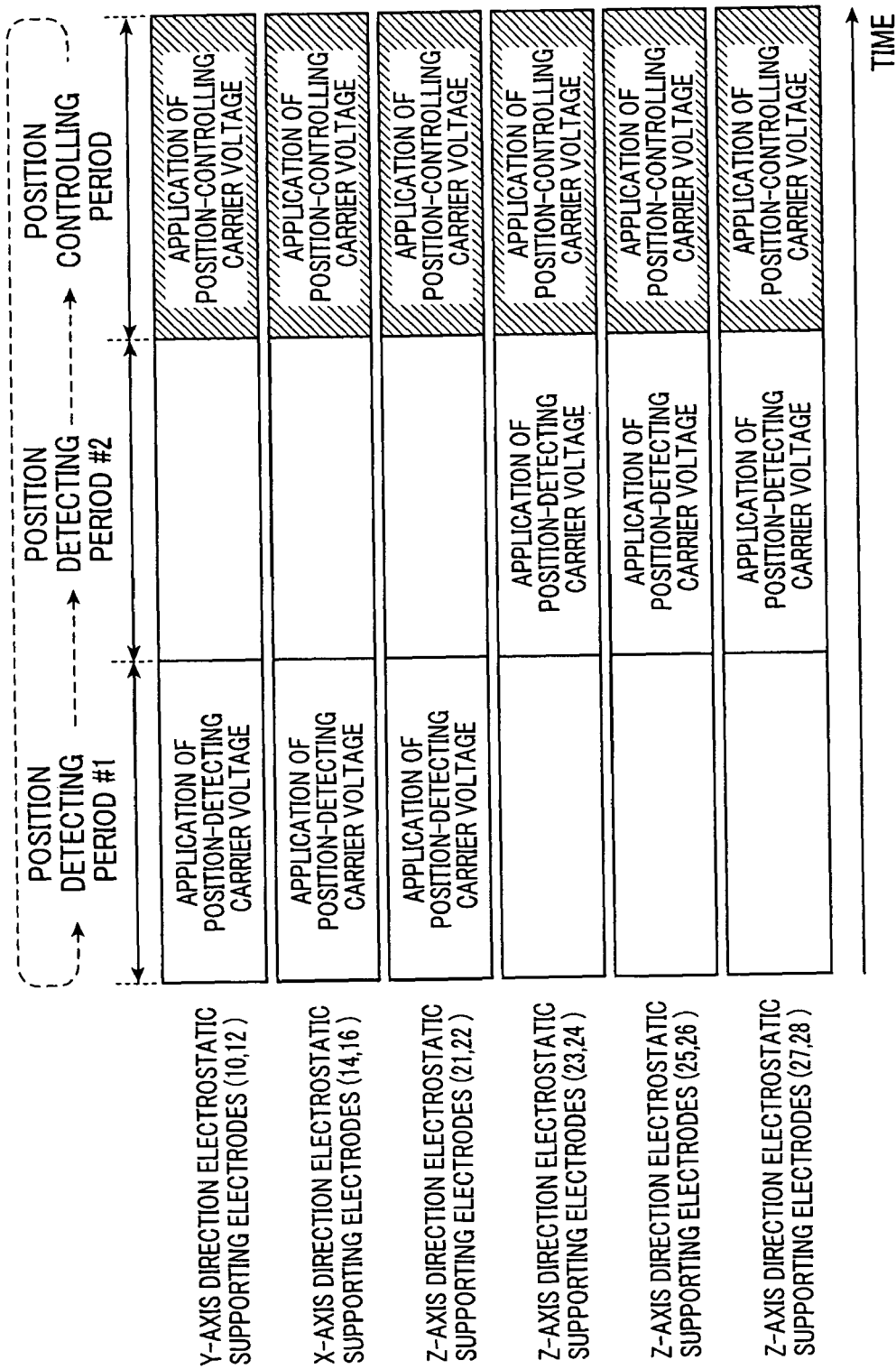

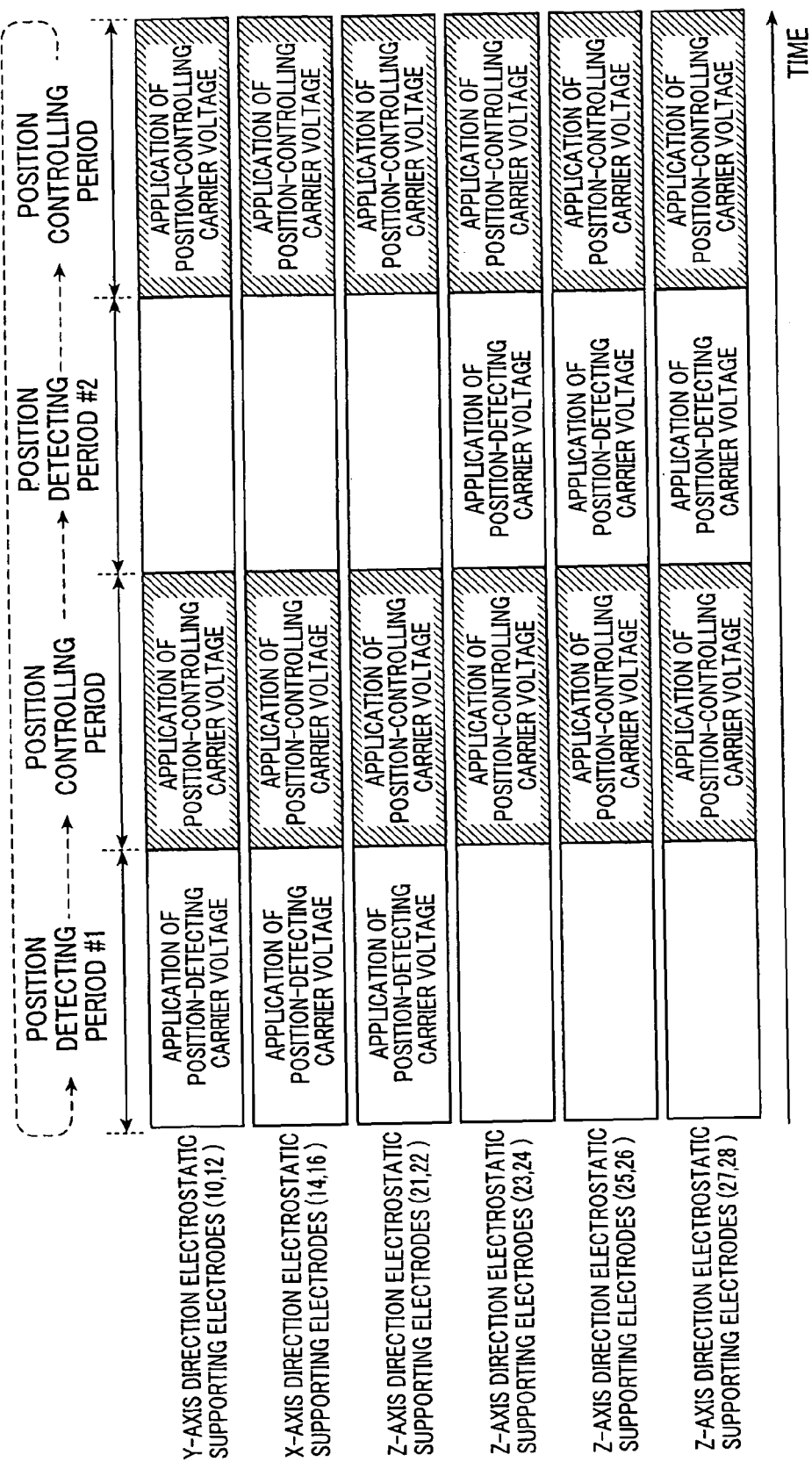

PHYSICAL QUANTITY MEASURING APPARATUS

CROSS-REFERENCE TO RELATED APPLICATION

This application is related to Japanese Patent Application No. 2008-261809 filed on Oct. 8, 2008, the contents of which are hereby incorporated by reference.

BACKGROUND OF THE INVENTION

1. Field of the Invention

The present invention relates to a physical quantity measuring apparatus for measuring a physical quantity such as an acceleration applied to a movable body by detecting a position of the movable body, and controlling the movable body at a predetermined position on the basis of the result of the position detection.

2. Description of Related Art

As such a physical quantity measuring apparatus, there is known an electrostatically levitated gyroscope configured to detect a position of a movable body disposed in a casing so as to be able to be electrostatically levitated, and feedback-control the movable body at a predetermined position in order to measure the acceleration or angular velocity of the movable body. For more details, refer to Japanese Patent Application Laid-open No. 2005-140709, for example.

This electrostatically levitated gyroscope includes a plurality of electrostatic supporting electrodes disposed so as to face each other across the movable body in each of three axis directions orthogonal to one another, and common electrodes for taking in signals from the main body. To measure physical quantities (accelerations, angular velocities, for example), the electrostatic supporting electrodes are applied with respective position-controlling voltages to position the movable body at a predetermined position in the casing, and also applied with respective position-detecting carrier voltages having different frequencies.

The position-detecting carrier voltages are also applied to the movable body through capacitive coupling between the movable body and each of the electrostatic supporting electrodes. The amplitudes of the position-detecting carrier voltages applied to the movable body vary in accordance with the movement of the movable body in the casing.

Theses carrier voltages applied to the movable body as signals for detecting the position of the movable body are taken in through the common electrodes, and are subjected to synchronous detection to detect the displacements of the movable body with respect to each of the electrostatic supporting electrodes. The position-controlling voltages applied to the electrostatic supporting electrodes are adjusted in accordance with the detected displacements to keep the movable body at the predetermined position.

Based on the detected displacements of the movable body with respect to the electrostatic supporting electrodes, the accelerations or angular velocities applied to the movable body (or the casing) are measured.

In the above electrostatically levitated gyroscope, the-position detecting carrier voltages are superimposed on the position-controlling voltages to enable keeping the movable body at the predetermined position while detecting the position of the movable body.

If PWM signals are used as the position-controlling voltages, since noise occurring when each PWM signal rises or falls is superimposed to the position-detecting carrier voltages, the position detection of the movable body may be adversely affected.

To solve this problem, in the electrostatically levitated gyroscope disclosed in the Japanese Patent Application Laid-open No. 2005-140709, a triangular wave voltage is used as the position-detecting carrier voltages. In more detail, the triangular wave voltage is applied to the electrostatic supporting electrodes in a time-divisional manner such that the pulse ends of the PWM signals coincide with the turnaround points of the triangular wave voltage to prevent the noise occurring when each PWM signal rises or falls from adversely affecting the position detection of the movable body.

To increase precision of the PWM signals to thereby increase the accuracy of the position control of the movable body, it is necessary to increase also the frequency of the position-detecting carrier voltage (the triangular wave) so that the turnaround points of the position-detecting carrier voltage can accurately coincide with the pulse ends of the PWM signals.

However, increasing the frequency of the position-detecting carrier voltage leads to increase of total cost of the detection circuits included in the electrostatically levitated gyroscope. In addition, there is a limit in increasing the frequency of the position-detecting carrier voltage because of parasitic capacitance etc. Hence, it has been difficult to increase the accuracy of the position detection of the movable body by increasing the resolution of the PWM signal.

SUMMARY OF THE INVENTION

The present invention relates to a physical quantity measuring apparatus comprising:

a first function of generating voltage used for position-controlling a movable body;

a second function of detecting a position of the movable body during a position detecting period;

a third function of calculating a control amount necessary to keep the movable body at a predetermined position on the basis of a detection result by the second function, and causing the first function to generate a control voltage corresponding to the calculated control amount to keep the movable body at the predetermined position during a position controlling period; and a fourth function of setting the position detecting period and the position controlling period in a time-sharing manner so that the position detecting period and the position controlling period do not overlap with each other.

According to the present invention, there is provided a physical quantity measuring apparatus of the type detecting a position of a movable body while feedback-controlling the movable body at a predetermined position, which can accurately detect the position of the movable body even when a voltage which rises and falls steeply, for example, a PWM-controlled voltage is used as a position-controlling voltage.

Other advantages and features of the invention will become apparent from the following description including the drawings and claims.

BRIEF DESCRIPTION OF THE DRAWINGS

In the accompanying drawings:

FIGS. 5A and 5B are diagram for explaining synchronous detecting operation performed by the demodulator;

FIG. 7 is a diagram for explaining operation of a detection/control switching circuit to switch between a position detecting period and a position controlling period included in the physical quantity measuring apparatus; and FIGS. 8A and 8B are diagrams for explaining operations of modifications of the detection/control switching circuit.

PREFERRED EMBODIMENTS OF THE INVENTION

Figure 1:
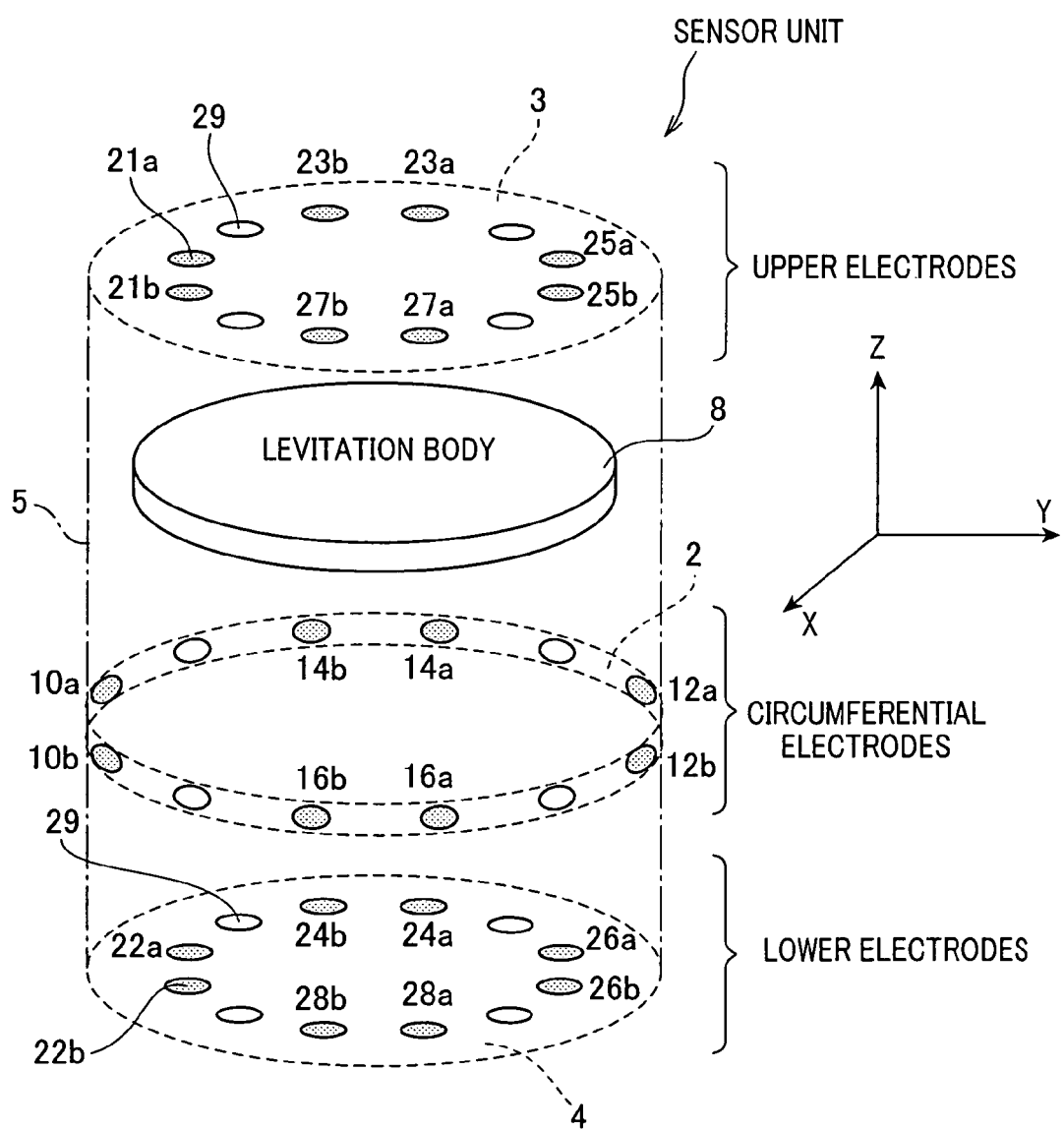
FIG. 1 is a diagram schematically showing the structure of a physical quantity measuring apparatus according to an embodiment of the invention.

FIG. 1 is a diagram schematically showing the structure of a physical quantity measuring apparatus according to an embodiment of the invention. As shown in this figure, the physical quantity measuring apparatus includes a casing 5 and a sensor unit 1. The casing 5 is constituted of a tube-like sidewall 2, upper and lower lids 3 and 4 closing the openings at both ends of the side wall 2. The sensor unit 1 includes a levitation body 8 disposed in the casing 5 so as to be electrostatically levitatable.

The casing 5 is made of insulator such as glass, the inside thereof being in vacuum. The levitation body 8 is made of conductor such as silicon. The sidewall 2 of the casing 5 is provided with circumferential electrodes 10, 12, 14 and 16 facing one another across the levitation body 8 in the directions of X-axis and Y-axis which are perpendicular to each other and perpendicular to the center axis of the levitation body 8 (Z-axis).

The upper lid 3 of the casing 5 is provided with upper electrodes 21, 23, 25 and 27 located around the center axis so as to face with each other in the direction of X-axis or Y-axis. The lower lid 4 is provided with lower electrodes 22, 24, 26 and 28 located so as to be opposed respectively to the upper electrodes 21, 23, 25 and 27.

Each of the electrodes 10 to 16 and 21 to 28 is constituted of paired electrodes, one being indicated by a suffix "a", the other being indicated by a suffix "b". The paired electrodes are applied with voltages of different polarities (V11 and its overlined version, or V12 and its overlined version, for example: see the partially enlarged part shown by the dotted line of FIG. 2) to generate an electrostatic force to attract the levitation body 8. Between these electrodes 10 to 16 and 21 to 28, a common electrode 29 not applied with the control voltage or a position-detecting carrier voltage (explained later) is provided.

Figure 2:
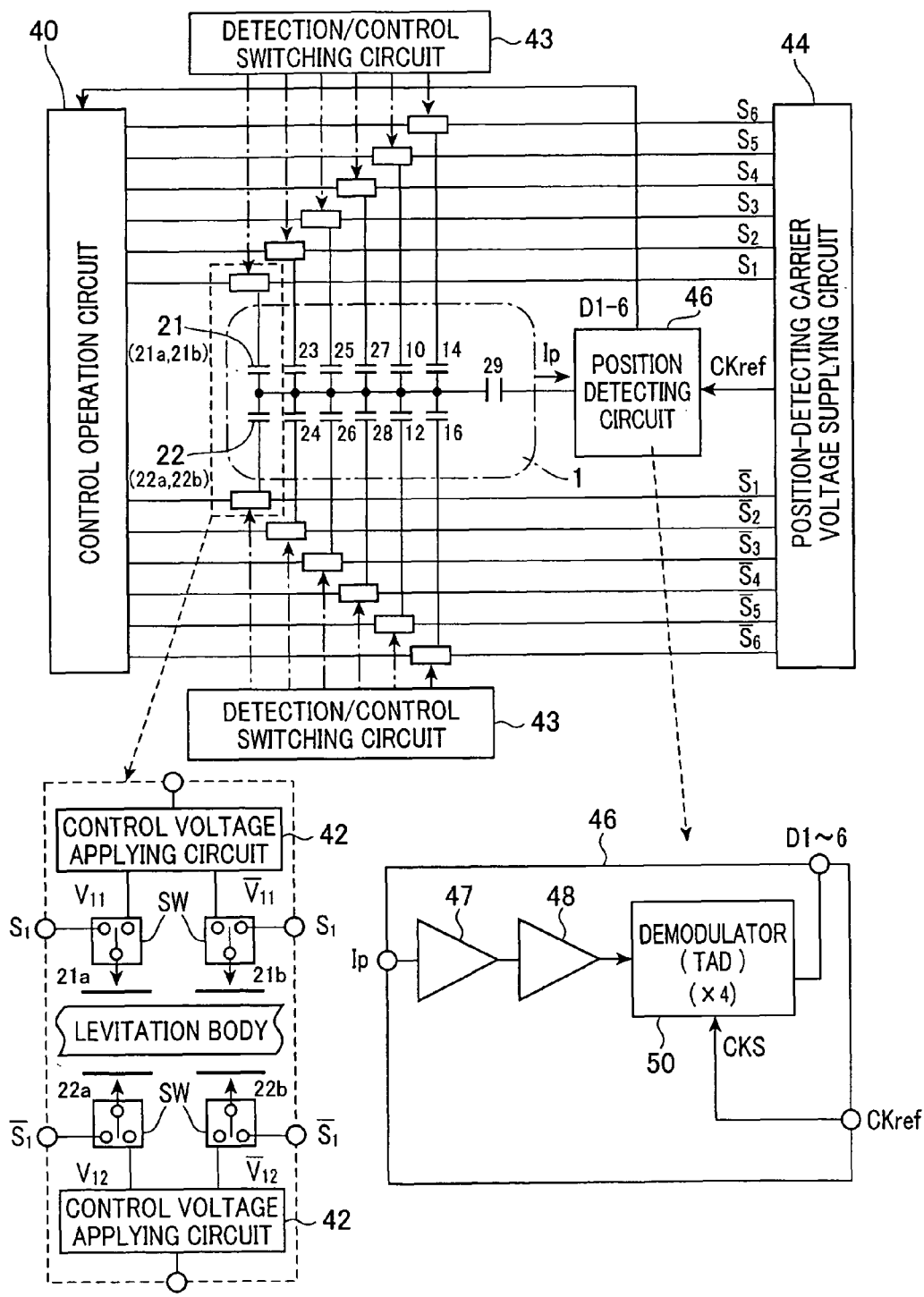
FIG. 2 is a block diagram showing an electric circuit structure of the physical quantity measuring apparatus.

FIG. 2 is a block diagram showing the electric circuit structure of the physical quantity measuring apparatus. As shown in this figure, the physical quantity measuring apparatus includes a control voltage applying circuit 42, a position-detecting carrier voltage supplying circuit 44, a position detecting circuit 46 and a control operation circuit 40. The control voltage applying circuit 42 applies position-controlling voltages to control the position of the levitation body 8 to the paired electrodes of each of the electrostatic supporting electrodes 10 to 16 and 21 to 28. The position-detecting carrier voltage supplying circuit 44 applies position-detecting carrier voltages to the electrostatic supporting electrodes 10 to 16 and 21 to 28. The position detecting circuit 46 takes in, through the common electrodes 29, the position-detecting carrier voltages applied to the levitation body object 8, and performs synchronous detection on these carrier voltages taken in from the levitation body 8 to detect the position of the levitation body 8 with respect to the electrostatic supporting electrodes 10 to 16 and 21 to 28. The control operation circuit 40 controls the control voltages which the control voltage applying circuit 42 applies to the electrostatic supporting electrodes 10 to 16 and 21 to 28 on the basis of the detection results by the position detecting circuit 46 in order that the levitation body 8 is kept at a predetermined position in the casing 5, while calculating the accelerations in the X-, Y- and Z-axes applied to the casing 5 and the angular velocity along the X- and Y-axes on the basis of the detection results by the position detecting circuit 46.

The position-detecting carrier voltage supplying circuit 44 is configured to apply the position-detecting carrier voltages which are the same in frequency and different in phase by 180 degrees to each two of the electrostatic supporting electrodes opposed across the levitation body 8 (for example, to the paired electrodes 21a and 21b and to the paired electrodes 22a and 22b; see the partially enlarged part shown by the dotted line of FIG. 2).

Figure 3:
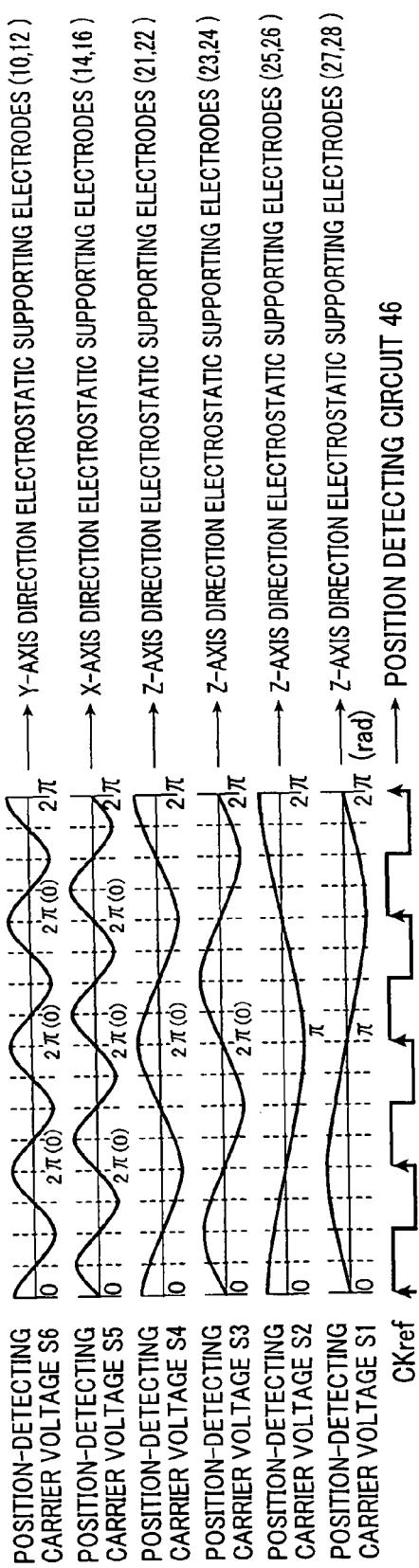
FIG. 3 is a diagram showing waveforms of position-detecting carrier voltages applied to electrostatic supporting electrodes included in a sensor unit of the physical quantity measuring apparatus.

As shown in FIG. 3, the position detecting-carrier voltages include six carrier voltages S1 to S6 having different frequencies and different phases. Each of these carrier voltages S1 to S6 is assigned to a corresponding one of six pairs of the paired electrodes.

In more detail, the carrier voltages S5 and S6 having the highest frequency and being different in phase by 90 degrees from each other are assigned respectively to the electrostatic supporting electrodes 10 and 12 provided on the side wall 2 of the casing 5 so as to be opposed to each other in the direction of the Y-axis, and respectively to the electrostatic supporting electrodes 14 and 16 provided on the side wall 2 of the casing 5 so as to be opposed to each other in the direction of the X-axis. The carriers 3 and S4 having the next highest frequency and being different in phase by 90 degrees from each other are assigned respectively to the electrostatic supporting electrodes 25 and 26 provided respectively on the upper lid 3 and the lower lid 4 of the casing 5 so as to be opposed to each other in the direction of the Z-axis, and respectively to the electrostatic supporting electrodes 27 and 28 provided respectively on the upper lid 3 and the lower lid 4 of the casing 5 so as to be opposed to each other in the direction of the Z-axis. The carriers 1 and S2 having the lowest frequency and being different in phase by 90 degrees from each other are assigned respectively to the electrostatic supporting electrodes 21 and 22 provided respectively on the upper lid 3 and the lower lid 4 of the casing 5 so as to be opposed to each other in the direction of the Z-axis, and respectively to the electrostatic supporting electrodes 23 and 24 provided respectively on the upper lid 3 and the lower lid 4 of the casing so as to be opposed to each other in the direction of the Z-axis.

Each of the electrostatic supporting electrodes 10 to 16 and 21 to 28 is applied with a corresponding one of the carriers S1 to S6 outputted from the position-detecting carrier voltage supplying circuit 44, and also applied with the control voltage for position control of the levitation body 8. Accordingly, this embodiment includes a switch for selecting one of the carrier voltage and the control voltage for each of the paired electrodes (see the partially enlarged part shown by the dotted line of FIG. 2).

These switches are switched at the same time to one of the side of the carrier voltages S1 to S6 or the side of the control voltage applying circuit 42 by a detection/control switching circuit 43. As shown in FIG. 2, the position detecting circuit 46 is constituted of a current-voltage converting circuit 47 for converting an input current Ip from the common electrodes 29 into a voltage, an amplifier 48 for amplifying the voltage from current-voltage converting circuit 47, and an demodulator 50 which performs synchronous detection on the voltage from the amplifier 48 to detect carrier voltages S1 to S6 to generate positions signals each of which indicates the position of the levitation body 8 with respect to corresponding ones of the electrostatic supporting electrodes applied with one of the carrier voltages S1 to S6.

Figure 4A:
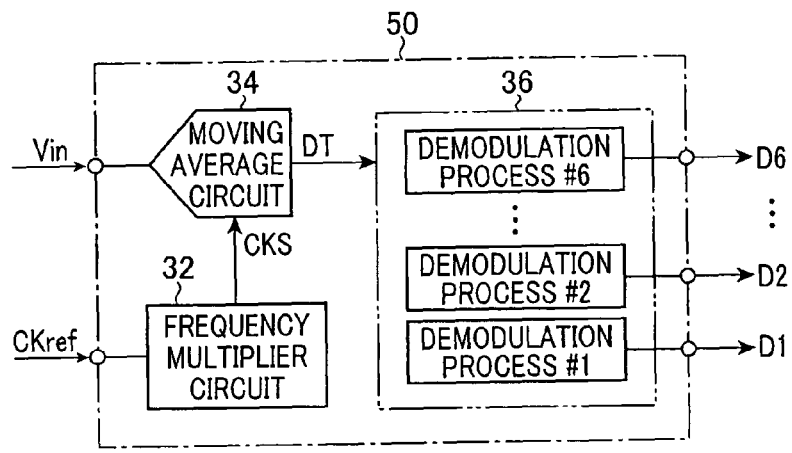
FIG. 4A is a block diagram of a demodulator included in the physical quantity measuring apparatus.

As shown in FIG. 4A, the demodulator 50 includes a frequency multiplier circuit 32, a moving average circuit 34 and a demodulating circuit 36. The frequency multiplier circuit 32 multiplies four times a reference clock CKref outputted from the position-detecting carrier voltage supplying circuit 44 to generate a sampling signal CKS having a period equal to one fourth the period of the reference clock CKref. The moving average circuit 34 moving-averages the input voltage signal Vin from the amplifier 48 for each period of the sampling signal CKS. The demodulating circuit 36 successively latches moving-averaged values DTx outputted from the moving average circuit 34 for each period of the sampling signal CKS during a predetermined demodulation period, and performs addition (integration) or subtraction (deintegration) on the latched moving-averaged values DTx in accordance with the periods and phases of the carrier voltages S1 to S6 to synchronously detect the carrier voltages S1 to S6.

As shown in FIG. 3, the reference clock CKref is synchronized with the carrier voltages S6 and S5 having the highest frequency of all the carrier voltages S1 to S6. The demodulation period is set equal to one period of the carrier voltages S1 and S2 having the lowest frequency of all the carrier voltages S1 to S6. The demodulating circuit 36 performs a calculation scheme shown in FIG. 5A on the moving-averaged values DTx received during the demodulation period to obtain the amplitudes of the carrier voltages S1 to S6.

That is, the demodulating circuit 36 performs a demodulation process as shown in FIG. 5A for each of the carrier voltages S1 to S6. In the demodulation process, of sixteen moving-averaged values DT1 to DT16 obtained during the demodulation period, those which have been obtained in a positive phase region with respect to the amplitude center of the carrier voltage are added up, and those which have been obtained in a negative phase region with respect to the amplitude center of the carrier voltage are subtracted therefrom. As a result, as shown in FIG. 5B, digital data sets D1 to D6 each of which is indicative of the amplitude of the signal to be detected are obtained. These digital sets are outputted as the result of the synchronous detection (the demodulation result).

Figure 4B:
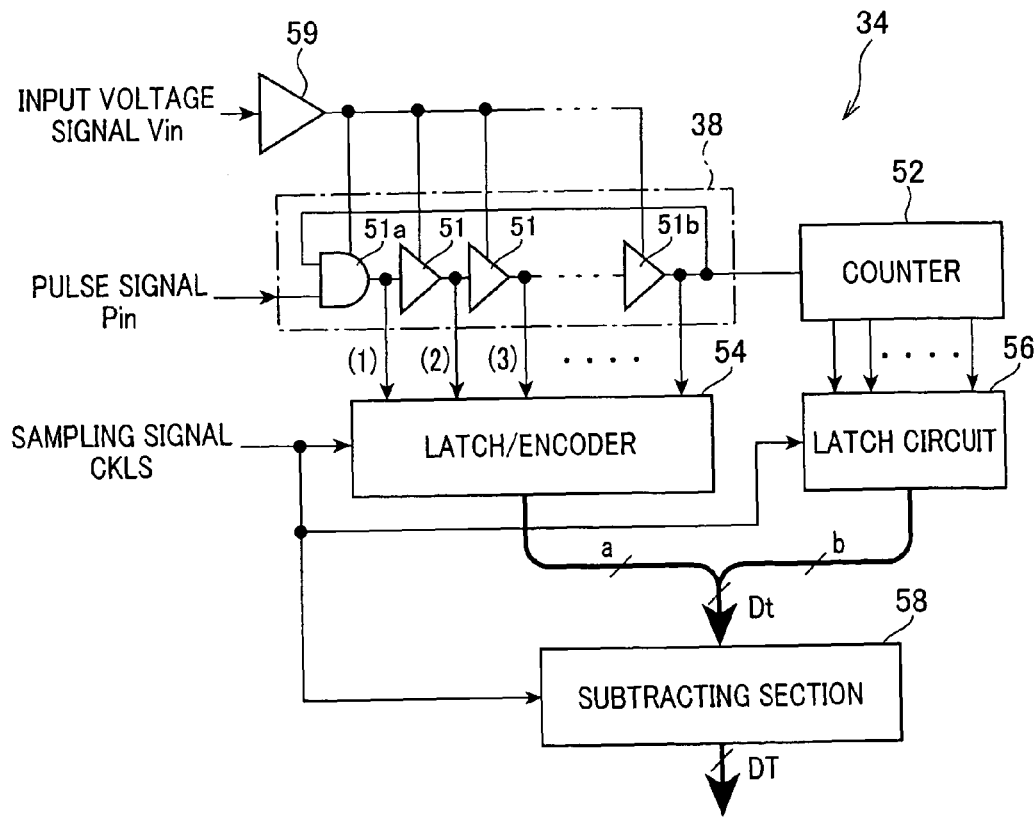
FIG. 4B is a block diagram of a moving average circuit included in the demodulator.

The moving average circuit 34 is constituted of a so-called time A/D converter (TAD). In more detail, as shown in FIG. 4B, the moving average circuit 34 includes a pulse delay circuit (ring delay line RDL in this embodiment) 38, a counter 52, a latch/encoder 54, a latch circuit 56 and a subtracting section 58. The pulse delay line 38 is constituted of a plurality of delay units 51 connected in a ring through which a pulse signal Pin goes around. Each of the delay units 51 delays the pulse signal Pin by a predetermined delay time. The counter 52 counts the number of times that the pulse signal Pin has gone around the pulse delay line 38. The latch/encoder 54 latches the position of the pulse signal Pin within the pulse delay circuit 38 at the timing of a rise or fall of the sampling signal CKS, and converts the latched position into digital data constituted of a certain number of bits indicative of the stage number of the delay unit 51 which the pulse signal Pin has just passed through from the front-end delay unit 51. The latch circuit 56 latches the count number of the counter 52 at the timing of a rise or fall of the sampling signal CKS. The subtracting section 58 takes in digital data Dt constituted of the output from the latch circuit 56 as higher-bit data b and the output of the latch/encoder 54 as lower-bit data a. Further, the subtracting section 58 calculates the difference between the digital data Dt taken in at the previous time and the digital data Dt taken in this time to generate digital data DT indicative of the number of the delay units 51 which the pulse signal Pin has passed through during one period of the sampling signal CKS.

Each of the delay units 51 constituting the pulse delay circuit 38 is a gate circuit constituted of inverters, for example, and is applied with the input voltage signal Vin from the amplifier 48 through a buffer 59.

The delay time of the delay unit 51 is determined by the voltage level of the input voltage signal Vin, and accordingly, the number of the delay units 51 which the pulse signal Pin has passed through during one period of the sampling signal CKS (that is, the output data DT from the moving average circuit 34) corresponds to the voltage level of the input voltage signal Vin moving-averaged during this period.

Incidentally, the first-stage delay unit 51a of the pulse delay circuit 38 is constituted of a gate circuit having two input terminals, one of which serves as a starting terminal, the other of which is connected to the output terminal of the last-stage delay unit 51b. Accordingly, when the pulse signal Pin is applied to the starting terminal of the first-stage delay unit 51a, it goes around the pulse delay circuit 38.

The digital data sets D1 to D6 obtained by synchronously detecting the carrier voltages S1 to S6 (or the position detection signals indicative of the positions of the levitation body 8 with respect to the electrostatic supporting electrodes 10 to 16 and 21 to 28) by the position detecting circuit 46 are outputted to the control operation circuit 40. The control operation circuit 40 calculates the accelerations in the X-, Y- and Z-axes on the basis of the digital data sets D1 to D6, calculates the rotational accelerations along the X- and Y-axes on the basis of the digital data sets D1 to D4 obtained from the outputs of the electrostatic supporting electrodes 21 to 28, and integrates the calculated rotational accelerations to calculate the angular velocities along the X- and Y-axes.

Further, the control operation circuit 40 calculates a control amount necessary to control the levitation body 8 to be at the predetermined position on the basis of the digital data sets D1 to D6, and outputs a control signal corresponding to the calculated control amount to the control voltage applying circuit 42. The control voltage applying circuit 42 sets the control voltage to be applied to each of the electrostatic supporting electrodes 10 to 16 and 21 to 28 in accordance with the control signal outputted from the control operation circuit 40.

In this embodiment, each control voltages which each control voltage applying circuit 42 applies to corresponding ones of the electrostatic supporting electrodes 10 to 16 and 21 to 28 is generated by driving an output transistor (not shown) by use of a PWM signal, and the control operation circuit 40 outputs the control signal indicative of the duty ratio of the PWM signal to each of the control voltage applying circuits 42.

Figure 6:
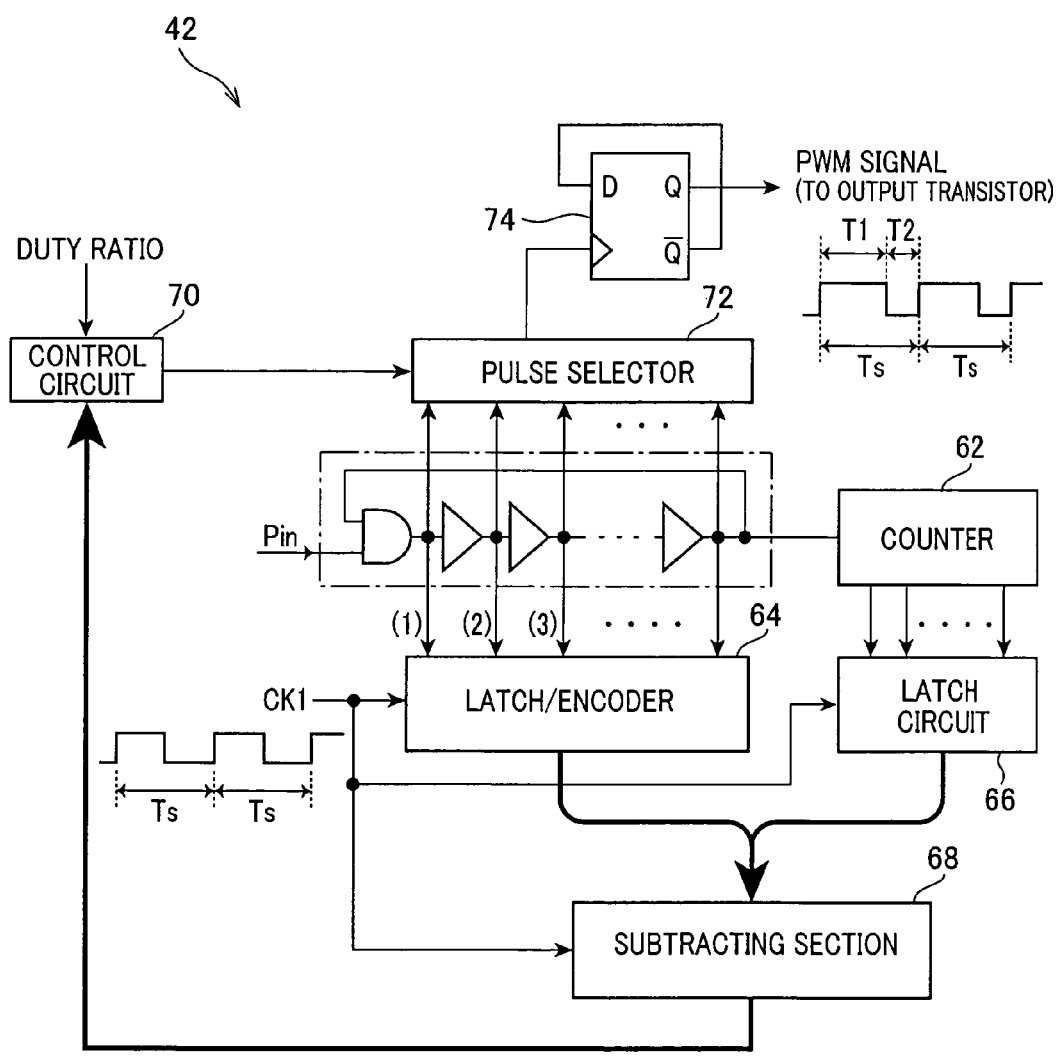
FIG. 6 is a block diagram of a control voltage applying circuit for generating a control voltage (PWM signal) to be applied to the electrostatic supporting electrodes included in the physical quantity measuring apparatus.

As shown in FIG. 6, the control voltage applying circuit 42 includes a pulse delay circuit (ring delay line RDL in this embodiment) 60 having the same structure as the pulse delay circuit 38 of the moving average circuit 34, a counter 62, a latch/encoder 64, a latch circuit 66 and a subtracting section

68. The counter 62 counts the number of times that a pulse signal Pin has gone around the pulse delay circuit 60. The latch/encoder 64 latches the position of the pulse signal Pin within the pulse delay circuit 60 at the timing of a rise or fall of a sampling signal CK1, and converts the latched position into digital data constituted of a certain number of bits indicative of the stage number of the delay unit 51 which the pulse signal Pin has just passed through from the front-end delay unit 51. The latch circuit 66 latches the count number of the counter 62 at the timing of a rise or fall of the sampling signal CK1. The subtracting section 68 takes in digital data constituted of the output of the latch circuit 66 as higher-bit data and the output of the latch/encoder 64 as lower-bit data. Further, the subtracting section 68 calculates the difference between the digital data taken in at the previous time and the digital data taken in this time to generate digital data indicative of the number of the delay units 51 which the pulse signal Pin has passed through during one period of the sampling signal CK1.

Each of the delay units 51 constituting the pulse delay circuit 60 is applied with a constant power supply voltage. As the sampling signal CK1, clocks having a constant period Ts equal to the period of the PWM signal to be generated are used. Accordingly, the subtracting section 68 outputs digital data indicative of one period (Ts) of the PWM signal.

The control voltage applying circuit 42 further includes a control circuit 70, a pulse selector 72 and a D flip-flop 74. The control circuit 70 calculates a high-level duration T1 and a low-level duration T2 of the PWM signal to be generated by dividing the digital data indicative of one period of the PWM signal calculated in the subtracting section 68 by the duty ratio indicated by the control signal outputted from the control operation circuit 40. The pulse selector 72 generates a pulse signal at the timing when the pulse signal going around the pulse delay circuit 60 reaches a specific selecting position in the pulse delay circuit 60 designated by the control circuit 70. The D flip-flop 74 latches the output at its inversion output terminal upon receiving the pulse signal outputted from the pulse selector 72.

The control circuit 70 sets the selecting position of the pulse signal such that the pulse selector 72 outputs the pulse signal to the D flip-flop 74 each time the high-time duration or the low-time duration of the PWM signal elapses.

Accordingly, the D flip-flop 74 outputs the PWM signal having the duty ratio (=T1/Ts) designated by the control operation circuit 40. The control voltage applying circuit 42 turns on and off the output transistor in accordance with the PWM signal to thereby PWM-control the control voltage applied to corresponding ones of the electrostatic supporting electrodes 10 to 16 and 21 to 28.

As explained above, in this embodiment, the control voltages to be applied to the electrostatic supporting electrodes 10 to 16 and 21 to 28 for the position control of the levitation body 8 are adjusted by the PWM signals. Accordingly, if the noise occurring when each PWM signal rises or falls were to be superimposed on the position-detecting carrier voltages, the position of the levitation body 8 could not be accurately detected.

Therefore, the physical quantity measuring apparatus according to this embodiment includes the detection/control switching circuit 43 to switch between applying the carrier voltages S1 to S6 to the electrostatic supporting electrodes 10 to 16 and 21 to 28, and applying the control voltages to the supporting electrodes 10 to 16 and 21 to 28.

Accordingly, according to this embodiment, it is possible to set a position detecting period to apply the carrier voltages S1 to S6 to the electrostatic supporting electrodes 10 to 16 and 21 to 28 to perform the position detection, and a position controlling period to apply the control voltages for position control in accordance with the result of the position detection to the electrostatic supporting electrodes 10 to 16 and 21 to 28 in an alternating manner so that they do not overlap with each other.

Hence, according to this embodiment, it is possible to prevent the noise occurring due to abrupt rises or falls of the control voltages applied to the electrostatic supporting electrodes 10 to 16 and 21 to 28 from being superimposed on the position-detecting carrier voltage during the position detecting period, and as a result the position of the levitation object 8 can be accurately detected.

In addition, since the position detection of levitation body 8 is performed by use of the moving average circuit 34 mainly constituted of the pulse delay circuit 38, and the control voltage applying circuit 42 is configured to generate the PWM signal by use of the pulse delay circuit 60, it is possible to implement these circuits as digital circuits constituted of various gate circuits, and accordingly, the physical quantity measuring apparatus according to this embodiment can be made compact in size and low in power consumption, and can be manufactured at low cost.

Incidentally, although the detection/control switching circuit 43 is shown in FIG. 2 to output the switching signals to the switches on the signal lines to which the position-detecting carrier voltage supplying circuit 44 delivers the carrier voltages S1 to S6 and their inverted versions, actually, the switching signals are also outputted to the control operation circuit 40 and the position detecting circuit 46 so that the position controlling period and the position detecting period can be controlled in each of these circuits.

Also, although the position detecting period and the position controlling period are shown to have the same duration in FIG. 7, actually, the position detecting period is set to have a minimum duration necessary to perform the position detection, and the position controlling period is set to have a longer duration than the position detecting period.

This is because it is preferable to perform the position detection with a high degree of accuracy by setting the position detecting period to have a sufficiently long duration, so that the PWM signal has high resolution to enable performing physical quantity measurement with high degree of resolution.

It is a matter of course that various modifications can be made to the above described embodiment.

For example, although the control voltage applying circuit 42 is configured to apply the control voltages for position control to the electrostatic supporting electrodes by turning on and off the output transistors in accordance with the duty-controlled PWM signals in the above embodiment, each of the voltage control signals may be a signal generated by combining pulse signals having different amplitudes (that is, a signal which varies in three voltage levels), or a PDM signal (pulse density modulation signal), or PAM signal (pulse amplitude modulation signal).

The detection/control switching circuit 43 is configured to set the position detecting period and the position controlling period alternately as shown in FIG. 7 in the above embodiment. However, as shown in FIG. 8A, two different position detecting periods and the position controlling period may be set sequentially, one of the two position detecting periods being a period to apply the position-detecting carrier voltage to one group including three of the six kinds of the electrostatic supporting electrodes (the electrostatic supporting electrodes 10 to 16, 21 and 22, for example), the other of the two position detecting periods being a period to apply the position-detecting carrier voltage to the other group including the other three of the six kinds of the electrostatic supporting electrodes (the electrostatic supporting electrodes 23 to 28, for example). This makes it possible to share the same circuit to perform the demodulating process of the demodulating circuit 36 between these two groups to simplify the circuit structure of the demodulating circuit 36.

Further, as shown in FIG. 8B, the position controlling period may be set between these two position detecting periods so that the position detection and the position control are performed alternately.

The above described embodiment is directed to a electrostatically levitated gyroscope, however, the present invention is applicable to any apparatus for measuring physical quantity by detecting and controlling the position of a movable object.

The above explained preferred embodiments are exemplary of the invention of the present application which is described solely by the claims appended below. It should be understood that modifications of the preferred embodiments may be made as would occur to one of skill in the art.

What is claimed is:

1. A physical quantity measuring apparatus comprising:
   a first function of generating a voltage used for position-controlling a movable body;
   a second function of detecting a position of said movable body during a position detecting period;
   a third function of calculating a control amount necessary to keep said movable body at a predetermined position on the basis of a detection result by said second function, and causing said first function to generate a control voltage corresponding to said calculated control amount to keep said movable body at said predetermined position during a position controlling period; and
   a fourth function of setting said position detecting period and said position controlling period in a time-sharing manner so that said position detecting period and said position controlling period do not overlap with each other; wherein
   said movable body is disposed in a casing provided with electrostatic supporting electrodes and common electrodes;
   said movable body being displaced within said casing depending on voltages applied from said first function to said electrostatic supporting electrodes;
   said second function being configured to apply position-detecting carrier voltages having different frequencies respectively to said electrostatic supporting electrodes as a position detecting signal, and take in, from said common electrodes, said position detecting signal applied to said movable body through said electrostatic supporting electrodes;
   said third function being configured to perform synchronous detection on said position detecting signal taken in from said common electrodes to detect said position detecting carrier voltages, control a value of said control voltage for each of said electrostatic supporting electrodes in accordance with results of said synchronous detection to keep said movable body at said predetermined position, and calculate acceleration or angular velocity of said movable body in accordance with said results of said synchronous detection; and
   the position-detecting carrier voltages are applied to all of the electrostatic supporting electrodes at a same timing within a same period.

2. The physical quantity measuring apparatus according to claim 1, wherein said fourth function sets said position controlling period to have a longer duration than said position detecting period.

3. The physical quantity measuring apparatus according to claim 1, wherein said control voltage generated by said first function is a voltage variable in two or more steps.

4. The physical quantity measuring apparatus according to claim 1, wherein said control voltage generated by said first function is one of a PWM-modulated voltage, a PDM-modulated voltage and a PAM-modulated voltage.

5. The physical quantity measuring apparatus according to claim 4, wherein said first function generates, as said control voltage, a PWM-modulated voltage by use of a pulse delay circuit detecting elapse of a time corresponding to each of a period and a pulse width of said PWM-modulated voltage.

6. The physical quantity measuring apparatus according to claim 1, wherein said position-detecting carrier voltages include a plurality of pairs of two carrier voltages having the same frequency and being different from each other in phase by 90 degrees.

7. The physical quantity measuring apparatus according to claim 6, wherein said second function includes:
   a pulse delay circuit constituted of cascade-connected delay units, said pulse delay circuit being applied with said position detecting signal taken in from said common electrodes as a signal to control a delay time of each of said delay units, a pulse signal passing through said delay units while being delayed by said delay time in succession; and
   a counter counting the number of said delay units which said pulse signal has passed through during each period of time equal to one fourth a period of one of said position-detecting carrier voltages having the highest frequency thereamong, said-position detecting carrier voltages being synchronously detected on the basis of count results by said counter.

8. The physical quantity measuring apparatus according to claim 1, wherein said second function detects a position of said movable body with respect each of a plurality of predetermined positions, and said fourth function sets said position detecting period for each of a plurality of groups to each of which each of said predetermined positions belongs.

9. The physical quantity measuring apparatus according to claim 8, wherein said fourth function sets said position controlling period between each adjacent two of said position detecting periods set for said plurality of said groups.

* * * * *